United States Patent [19]

Zocher

[11] Patent Number: 5,002,723

[45] Date of Patent: Mar. 26, 1991

[54] NUCLEAR FUEL ELEMENT

[75] Inventor: Roy W. Zocher, Los Alamos, N. Mex.

[73] Assignee: The United States fo America as represented by the United States Department of Energy, Washington, D.C.

[21] Appl. No.: 333,934

[22] Filed: Apr. 6, 1989

[51] Int. Cl.⁵ .............................................. B21C 3/00
[52] U.S. Cl. .................................... 376/412; 376/409; 376/457; 264/0.5; 420/461; 29/428; 29/906
[58] Field of Search ............... 376/409, 426, 429, 412; 264/0.5; 420/461

[56] References Cited

U.S. PATENT DOCUMENTS

| | | | |
|---|---|---|---|
| 3,085,954 | 4/1963 | Stohr et al. | 204/154.2 |
| 3,129,140 | 4/1964 | Stohr et al. | 176/76 |
| 3,192,621 | 7/1965 | Bauer et al. | 29/510 |
| 3,669,833 | 6/1972 | De Boeck et al. | 176/68 |
| 3,970,450 | 7/1976 | Liu et al. | 75/172 |
| 4,626,414 | 12/1986 | Baatz et al. | 422/159 |
| 4,756,870 | 7/1988 | Lahr et al. | 376/272 |
| 4,847,009 | 7/1989 | Madle et al. | 252/633 |
| 4,894,203 | 1/1990 | Adamson | 376/416 |

Primary Examiner—Stephen J. Lechert, Jr.
Assistant Examiner—Nina Bhat
Attorney, Agent, or Firm—Richard J. Cordovano; Paul D. Gaetjens; William R. Moser

[57] ABSTRACT

A nuclear fuel element and a method of manufacturing the element. The fuel element is comprised of a metal primary container and a fuel pellet which is located inside it and which is often fragmented. The primary container is subjected to elevated pressure and temperature to deform the container such that the container conforms to the fuel pellet, that is, such that the container is in substantial contact with the surface of the pellet. This conformance eliminates clearances which permit rubbing together of fuel pellet fragments and rubbing of fuel pellet fragments against the container, thus reducing the amount of dust inside the fuel container and the amount of dust which may escape in the event of container breach. Also, as a result of the inventive method, fuel pellet fragments tend to adhere to one another to form a coherent non-fragmented mass; this reduces the tendency of a fragment to pierce the container in the event of impact.

13 Claims, 2 Drawing Sheets

NUCLEAR FUEL ELEMENT

BACKGROUND OF THE INVENTION

This invention relates to the art of nuclear material handling and processing and, more particularly, it relates to containment of nuclear fuel. This invention is the result of a contract with the Department of Energy (Contract No. W-7405-ENG-36).

This invention was made in connection with a particular application of nuclear material in which the nuclear material provides heat which is used to generate electric power for spacecraft. The present invention will be described in the terms of this application. However, those skilled in the art will appreciate that the invention has broad application in the area of nuclear fuels and is not limited to this application.

A nuclear fuel material is normally encapsulated within a thin-walled metal container which serves as a primary containment vessel for the fuel. The container is often called cladding. The nuclear fuel material is usually formed into particular shapes termed pellets. An assembly of one or more fuel pellets inside a container is often called a fuel element. The fuel elements described herein are used in a general purpose heat source, which is a component of a radioisotope thermoelectric generator. Four fuel elements having one fuel pellet in each element are contained in a fuel module of specially formulated filament carbon and a number of modules are used in a thermoelectric generator. A fuel element of this invention is commonly called a fueled clad, where clad is used as a noun. A fuel pellet used in a general purpose heat source consists of plutonium dioxide enriched in the plutonium 238 isotope and is in the form of a right circular cylinder having a diameter of about 1.1 in. (2.79 cm) and a height of about 1.1 in. (2.79 cm), with the edges at the ends of the cylinder being rounded to a radius of about 0.02 in. (0.051 cm). The plutonium, which has an atomic weight of 238, decays to produce several products, including heat and helium.

A container for a general purpose heat source fuel pellet is cylindrical in shape, has a wall thickness of about 0.028 in. (0.071 cm) and is usually fabricated of iridium, platinum, or alloys of iridium or platinum, though other materials may be used. A container consists of two separate parts which are welded together at the midpoint of the cylinder and are termed cups. One part is called the vent cup because it has a vent at its end to allow helium to escape. However, the vent is covered and is gas tight during manufacture of the fuel element and is activated only after the steps of this inventive manufacturing process are completed. The other part is termed the shield cup because it has a cylindrical weld shield with open ends tack welded to the interior of the cup. The shield projects out of the shield cup and serves as a crude alignment device when the two cups are put together. Weld shield thickness is about 0.005 in. (0.013 cm). During the manufacturing process, the cups are assembled with a fuel pellet inside to form a closed container and are then joined by fusion welding to form a gas-tight container. The inside dimensions of the container are slightly larger then the exterior dimensions of the fuel pellet. It is highly desirable that the fuel elements be as small as possible and have a high density, consistent with the need for release of the helium generated; thus, it is not practical to use larger containers having inside them means to immobilize a fuel pellet.

Despite the existence of the weld shield, the welding process subjects the ceramic fuel pellet to thermal stresses and usually causes it to fracture into several pieces. In addition, other steps in the thermoelectric generator manufacturing process and the initial use of a generator may cause the fuel pellet to break up. Also, because it is so difficult to manufacture a fuel element having its fuel pellet intact, it is permissible manufacturing practice to assemble a fuel element having a fractured fuel pellet. When a fuel element is subjected to impact, a fuel element fragment may punch through the thin-walled container, whereas a complete pellet will not punch through.

By the time the heat source manufacturing process is complete, a portion of the plutonium oxide inside the primary containers is in fine particulate form; this is caused by movement of pellet fragments relative to one another and relative to the container. Also, as the fuel elements are subjected to movement and vibration, even through the clearances between pellet fragments and pellet and container are very small, a good deal of dust is generated within the containers.

Since plutonium in respirable form is highly toxic, it is desirable to take precautions to limit generation of fine dust and to prevent its escape from the fuel containers in accident situations. Accidental release of finely divided respirable plutonium into the environment of a spacecraft or the biosphere can have catastrophic human consequences.

SUMMARY OF THE INVENTION

This invention is a nuclear fuel element and a method of manufacturing the element. The fuel element is comprised of a metal primary container and a fuel pellet which is located inside it and which is often fragmented. The primary container is subjected to elevated pressure and temperature to deform the container such that it conforms to the fuel pellet, that is, such that the container is in substantial contact with the surface of the pellet. This conformance eliminates clearances which permit rubbing together of fuel pellet fragments and rubbing of fuel pellet fragments against the container, thus reducing the amount of dust inside the fuel container and the amount of dust which may escape in the event of container breach. Also, as a result of practice of this invention, fuel pellet fragments tend to adhere to one another to form a coherent non-fragmented mass; this reduces the tendency of a fragment to pierce the container in the event of impact.

An object of this invention is to enhance the resistance to failure of a nuclear fuel primary containment vessel in the event of an accident.

It is also an object of this invention to enhance the retention of nuclear fuel in accidents severe enough to breach the primary container.

It is a further object of this invention to immobilize the contents of a fuel container to prevent mechanical attrition of the fuel pellet as pellet fragments move relative to other fragments and the container.

Another object of this invention is to provide a fuel element having a minimum volume.

It is yet another object of this invention to prevent vibration-induced material damage to a secondary container, in cases where a secondary container surrounds the primary containment vessel, by reducing displacement clearances in the primary container.

In a broad embodiment, this invention is a method of manufacturing a nuclear fuel element comprised of a fuel pellet and a primary container, said method comprising assembling a metal primary container with a fuel pellet located inside it, where said container is comprised of at least two parts which completely enclose said fuel pellet and has dimensions suitable for conformance to the fuel pellet; welding together the parts of the container to make the container gas tight; subjecting said welded container to heat, as required, and to external pressure sufficient to deform the container by forcing the interior surface of the container into conformance with exterior surface of the fuel pellet so that there are no substantial gaps between said interior surface of the container and said exterior surface of the fuel pellet.

DETAILED DESCRIPTION OF THE INVENTION

Figure 1:
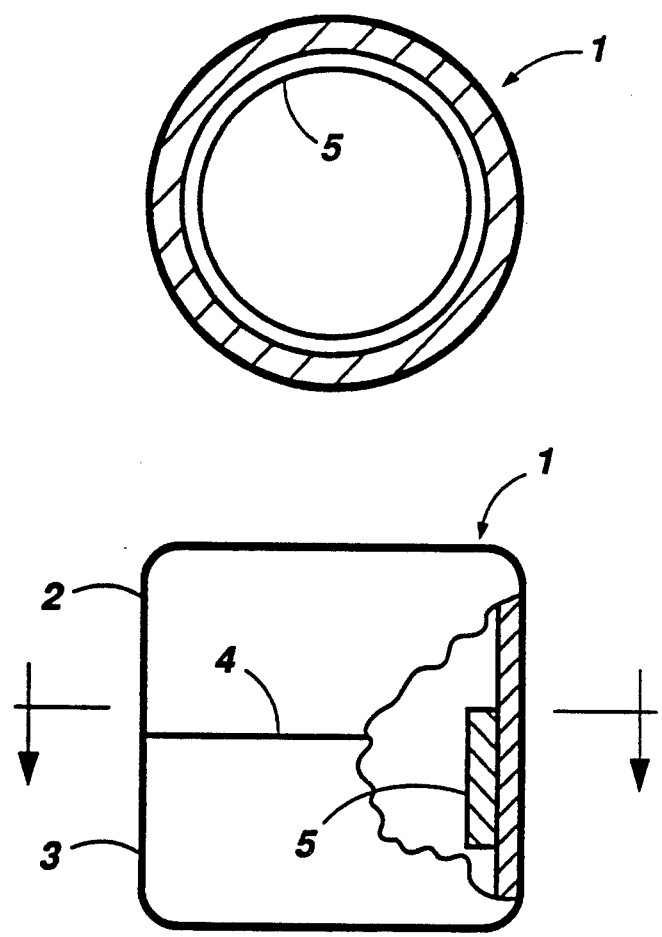
FIG. 1 is a schematic depiction of an empty fuel container in an elevation view with a cut away portion and a sectional view taken as shown by the section arrows. It is not to scale and thicknesses are exaggerated for purposes of clarity.

This invention is further described in the following paragraphs in terms of the particular application of nuclear fuel which was discussed above. Referring to FIG. 1, empty fuel container 1 is shown in an elevation view and a top section view. The vent assembly of vent cup 2 is not shown, as it is not relevant to the present invention. Circumferential weld 4, which joins vent cup 2 and shield cup 3, is shown at the midpoint of container 1 in the elevation view. A portion of the elevation view is cut away to show weld shield 5, which is also visible in the section view. Weld shield 5, which is shown with its thickness exaggerated for purposes of clarity, is fastened to shield cup 3 by tack welds (not shown) and serves as an alignment guide when the two cups are assembled.

In the practice of the invention, the parts of a primary container are assembled with the fuel pellet inside and the parts are welded together to form a unitary gas-tight container. In the embodiment of FIG. 1, the container is in only two parts. The container is then subjected to heat and external pressure by means of isostatic pressing equipment, where the container is submerged in a fluid which can be raised to a desired pressure and a desired temperature.

The temperature of the fuel container (with the fuel pellet inside) is raised to a value sufficient to permit ductile deformation of the container by means of a reasonable applied pressure. In the case of a commonly used iridium alloy, it is necessary to raise the temperature to a value above the brittle-ductile transition temperature range of the alloy, which is about 600° C. With this iridium alloy, which contains 0.3% tungsten and 100 ppm of thoria, it is not desirable to increase the temperature beyond about 1200° C., to avoid grain growth and the consequent loss of ductility. Excepting the necessity that the container be in a ductile state, the temperature at which the invention is practiced is not critical. The peak temperature used in the practice of this invention may range from about 100° C. to about 1500° C.

It is desirable to increase the temperature slowly to avoid thermal shock. A heat-up period of about 1½ hours was used in experimentation with the iridium alloy container and uranium oxide pellet which is described below. After reaching a peak temperature of 1000° C., the fuel element was allowed to cool to room temperature over a period of about ½ hour. In the practice of this invention, it is expected that heating a fuel element from room temperature to its peak temperature will be accomplished in from about 15 minutes to about 3 hours and cooling back to room temperature will take from about 15 minutes to about 2 hours.

Sufficient pressure must be applied to the container to force the interior surface of the container into conformance with the external surface of the fuel pellets, such that there are no substantial gaps between the surfaces. Also, it is desirable that sufficient pressure be applied to promote a sintered bond between fuel pellet fragments to form a coherent pellet. It is expected that pressures in the range of from about 500 psi ($3.447 \times 10^3$ kPa) to about 50,000 psi ($3.447 \times 10^5$ kPa) will be used. The dimensions of a container must be suitable for conformance to the fuel pellet placed inside the container; that is, the container must not be too much larger than the pellet such that the container does not readily deform to conform to the pellet, but instead there are gaps between container and pellet.

The Table presents the results of tests on a single iridium alloy container having inside it a depleted uranium (238) oxide fuel pellet. Depleted uranium was used in place of plutonium for reasons of safety. The dimensions of the fuel pellet, measured before assembly into the fuel element, were 1.085 in. (2.756 cm) diameter by 1.085 in. (2.756 cm) long. The diameters shown in the Table are outside diameters. In each of 5 tests the container was as heated to 1000° C. while the applied pressure was as shown in the Table and then cooled to room temperature so that container measurements could be taken.

TABLE

| | | FUEL ELEMENT DIMENSIONS FOR SEQUENTIAL ISOTATIC PRESSURE EXPOSURE | | | |
|---|---|---|---|---|---|
| TEST | PRESSURE AT 1000° C. | VENT CUP DIAMETER, in. (cm) | SHIELD CUP DIAMETER, in. (cm) | WELD DIAMETER, in. (cm) | LENGTH, in. (cm) |
| Before Test | — | 1.172 (2.977) | 1.169 (2.969) | 1.178 (2.992) | 1.176 (2.987) |
| 1 | 1000 psi (6894 kPa) | 1.167 (2.964) | 1.168 (2.967) | 1.175 (2.984) | 1.150 (2.921) |
| 2 | 1500 psi (10,341 kPa) | 1.156 (2.936) | 1.152 (2.926) | 1.167 (2.964) | 1.147 (2.913) |
| 3 | 2000 psi | 1.151 (2.924) | 1.148 (2.916) | 1.169 (2.969) | 1.146 (2.911) |

TABLE-continued

FUEL ELEMENT DIMENSIONS FOR SEQUENTIAL ISOTATIC PRESSURE EXPOSURE

| TEST | PRESSURE AT 1000° C. | VENT CUP DIAMETER, in. (cm) | SHIELD CUP DIAMETER, in. (cm) | WELD DIAMETER, in. (cm) | LENGTH, in. (cm) |
|---|---|---|---|---|---|
| 4 | 3000 psi (13,788 kPa) (20,682 kPa) | 1.146 (2.911) | 1.146 (2.911) | 1.166 (2.962) | 1.141 (2.898) |
| 5 | 4000 psi (27,576 kPa) | 1.141 (2.898) | 1.142 (2.901) | 1.163 (2.954) | 1.139 (2.893) |

Figure 2:
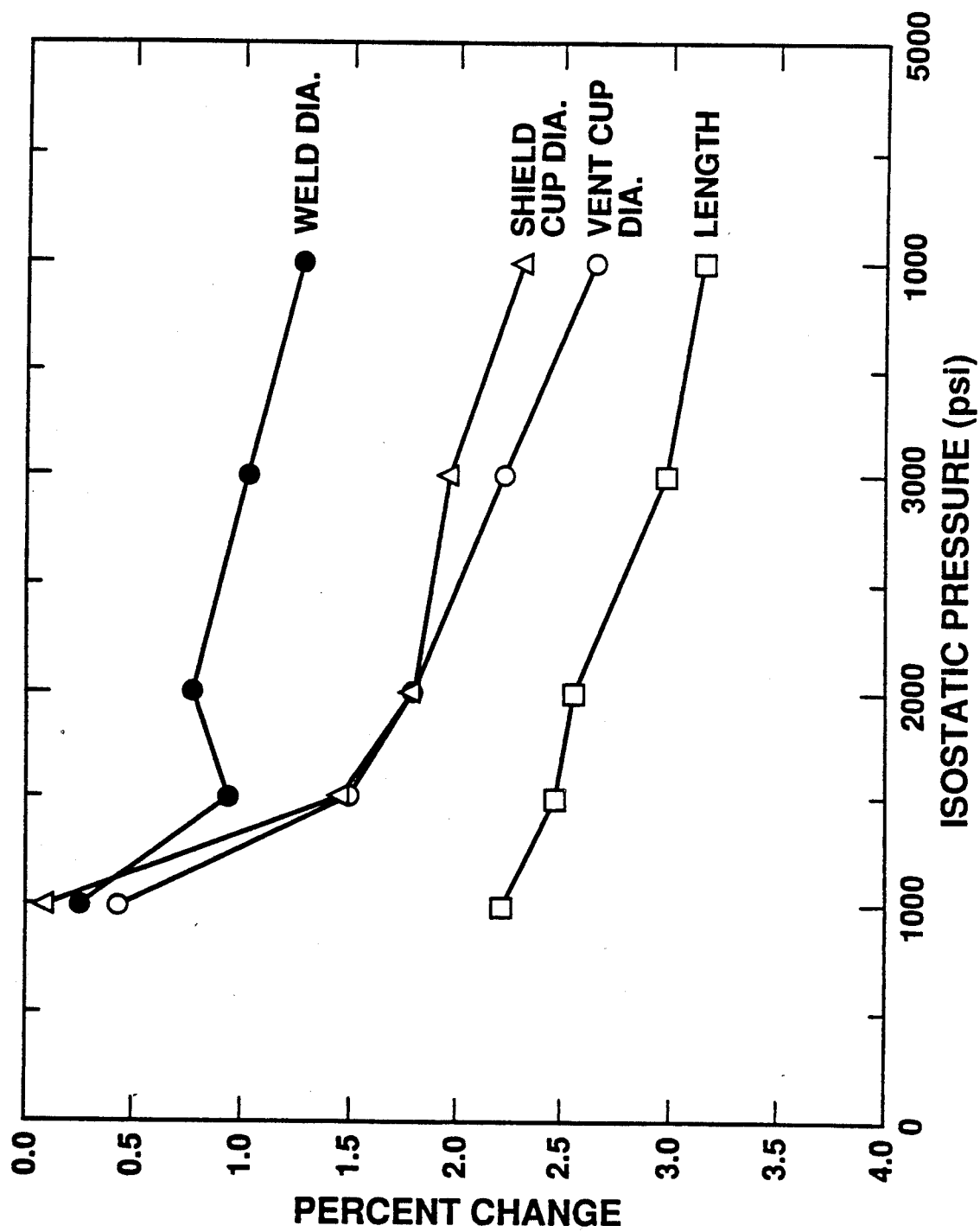
FIG. 2 shows the relative decrease in size of a single primary containment vessel containing a fuel pellet as heat and increasing amounts of external pressure were applied to it.

FIG. 2 presents the results of the experiment in terms of the percent decrease in each dimension caused by each of the five values of applied pressure. No explanation is available for the increase in weld diameter after 2000 psi was applied; one can only speculate that the measurement location was inadvertently changed.

As a fuel element is heated, at least enough external pressure must be applied to the element to prevent internal pressure resulting from the helium inside the container from initially expanding the container. When the container conforms itself to the pellet, the helium gas inside the container occupies pores of the fuel element, so that complete conformance is not prevented by the gas.

It is intended that the claims presented herein cover embodiments where one or more fuel pellets are located inside a primary container to form a single fuel element.

As mentioned above, the present invention has broad application in the area of nuclear fuels, though it is described herein in terms of a particular exemplary application. A fuel element may contain more than one fuel pellet and the invention is applicable to fuel elements and pellets having different dimensions than those mentioned herein. The materials of a fuel element and fuel pellet may be different from these mentioned herein. A container may consist of more than two parts and may be other than cylindrical in shape, so that it will conform to a fuel pellet which is not cylindrical.

What is claimed is:

1. A method of manufacturing a radioactive-decay heat source comprised of a fuel pellet and a metal primary container in which container a fuel pellet or a fractured fuel pellet is immobilized in order to prevent mechanical attrition and breach of said primary container, said method comprising:
   a. assembling said primary container with a fuel pellet located inside it, where said container is comprised of at least two parts which completely enclose said fuel pellet and has dimensions suitable for conformance to the fuel pellet;
   b. welding together the parts of the container to make the container gas tight;
   c. subjecting said welded container to heat, as required, and to external pressure sufficient to deform the container by forcing the interior surface of the container into conformance with the exterior surface of the fuel pellet or fractured fuel pellet so that there are no substantial gaps between said interior surface of the container and said exterior surface of the fuel pellet or fractured fuel pellet.

2. The method of claim 1 where said fuel pellet is plutonium oxide.

3. The method of claim 1 where said container is comprised of iridium or an iridium alloy.

4. The method of claim 1 where said welded container is heated to a temperature of from about 100° C. to about 1500° C. while said exterior pressure is applied.

5. The method of claim 1 where said welded container is heated to a temperature of about 1000° C. while said external pressure is applied.

6. The method of claim 1 where said external pressure is from about 500 psi to about 50,000 psi ($3.447 \times 10^3 - 3.447 \times 10^5$ kPa).

7. The method of claim 1 where said external pressure is 4000 psi ($2.757 \times 10^4$ kPa).

8. The method of claim 1 where said welded container is heated from room temperature to a peak temperature over a period of from about 15 minutes to about 3 hours.

9. The method of claim 1 where said welded container is heated from room temperature to a peak temperature over a period of 1½ hours.

10. The method of claim 1 where said welded container is cooled from a peak temperature to room temperature over a period of from about 15 minutes to about 2 hours.

11. A radioactive-decay heat source comprised of a fuel pellet and a primary container in which container a fuel pellet or a fractured fuel pellet is immobilized in order to prevent mechanical attrition and breach of said primary container, where the interior surface of said container is in conformance with the exterior surface of said fuel pellet or fractured fuel pellet such that there are no substantial gaps between said interior surface of the container and said exterior surface of the fuel pellet or fractured fuel pellet.

12. The radioactive-decay heat source of claim 11 where said fuel pellet is comprised of plutonium dioxide.

13. The radioactive-decay heat source of claim 11 where said container is comprised of iridium or an iridium alloy.

* * * * *